United States Patent [19]

Burton et al.

[11] Patent Number: 4,570,977

[45] Date of Patent: Feb. 18, 1986

[54] MECHANICAL CONNECTOR APPARATUS

[75] Inventors: James A. Burton; Richard B. Lee, both of Houston, Tex.

[73] Assignee: Hydril Company, Los Angeles, Calif.

[21] Appl. No.: 505,208

[22] Filed: Jun. 17, 1983
(Under 37 CFR 1.47)

[51] Int. Cl.$^4$ ............................................. F16L 55/00
[52] U.S. Cl. ........................................ 285/39; 403/16; 403/321; 285/86; 285/141; 285/313; 285/315; 285/321; 285/DIG. 23
[58] Field of Search ..................... 285/39, 85, 86, 141, 285/308, 313, 315, 317, 321, DIG. 23; 166/217, 206; 403/16, 321, 322, 326; 294/86.24, 86.25, 86.19

[56] References Cited

U.S. PATENT DOCUMENTS

| | | | |
|---|---|---|---|
| 3,055,431 | 9/1962 | Clark, Jr. et al. | 166/217 |
| 3,171,674 | 3/1965 | Bickel et al. | 285/317 |
| 3,844,127 | 10/1974 | Koop, Jr. et al. | 285/141 |
| 4,138,148 | 2/1979 | Zaremba | 285/317 |
| 4,307,902 | 12/1981 | Schnatzmeyer | 285/39 |
| 4,360,226 | 11/1982 | Burton | 285/223 |
| 4,373,752 | 2/1983 | Nelson | 285/141 |
| 4,422,507 | 12/1983 | Reimert | 285/141 |

*Primary Examiner*—Cornelius J. Husar
*Assistant Examiner*—Eric K. Nicholson
*Attorney, Agent, or Firm*—Dodge, Bush & Moseley

[57] ABSTRACT

A connector apparatus for releasably securing two separate force transmitting assemblies in a force transfer relationship is disclosed. A first connector assembly having a tubular member forming a central opening having a locking recess formed therein is anchored at a desired location. A second connector assembly having a primary and a secondary housing operably connects with the first connector assembly for transferring the static forces therebetween. The primary housing mounts an expandable locking ring which fits in the recess of the first connector assembly for effecting the mechanical securing. The locking ring may be released by two separate modes of operation. When released, all operating parts of the connector except the first connector assembly may be retrieved to a convenient location for inspection or repair. Should the locking ring fail to release by either mode, the secondary housing may in the alternative be released from the primary housing.

10 Claims, 1 Drawing Figure

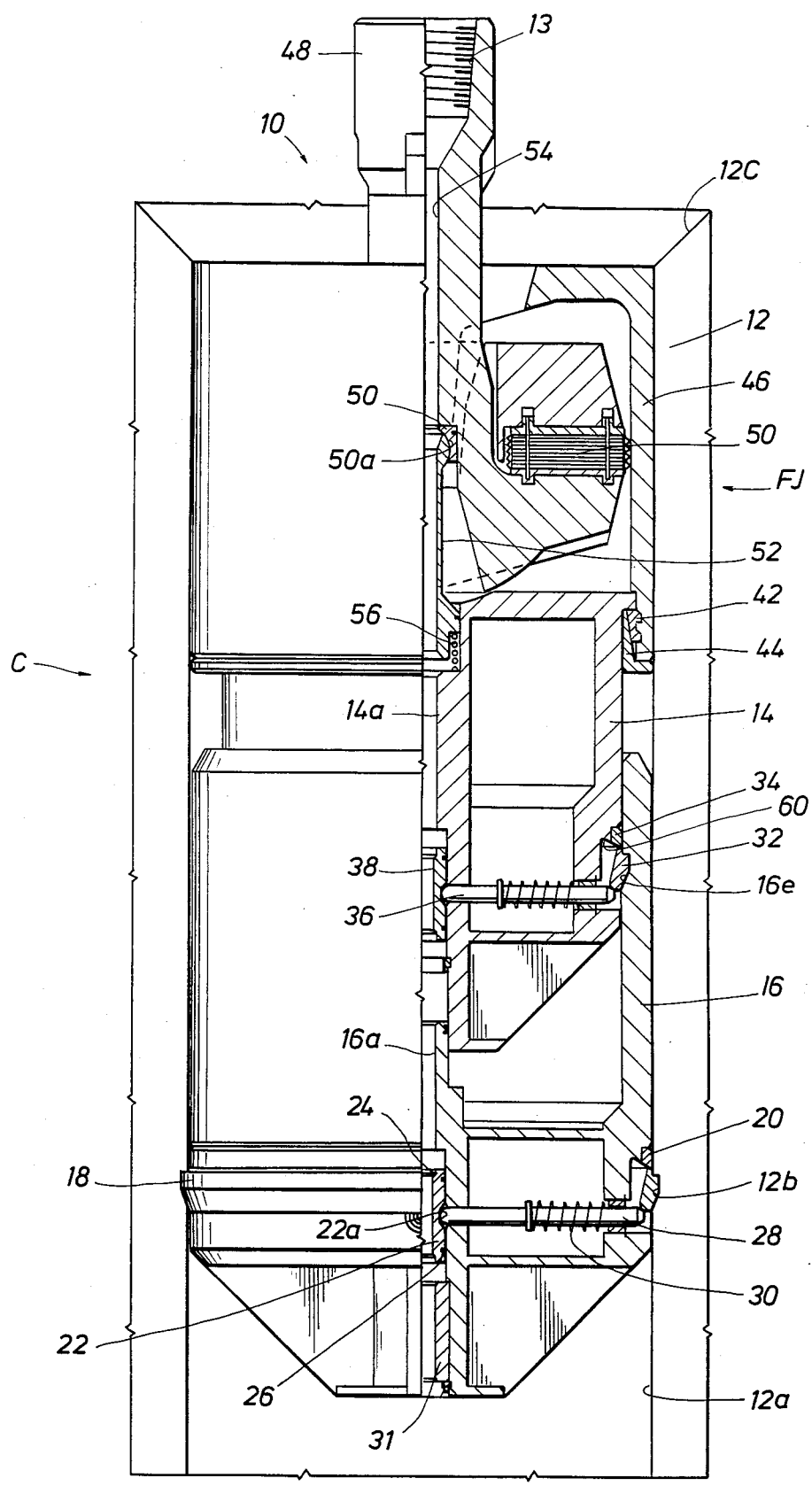

MECHANICAL CONNECTOR APPARATUS

TECHNICAL FIELD

The present invention relates broadly to the field of connectors for mechanically joining separate members in a secured relationship to enable force or load transfer and in particular to a mechanical connector having high strength tension force load carrying capability. The connector apparatus is also provided with a flexible joint for compensating for limited relative angular movement of the connected members.

BACKGROUND ART

U.S. Pat. No. 4,360,226, the disclosure of which is incorporated herein, considers at length the the tubular mechanical connector prior art and in particular of flexible connectors enabling relative angular movement. Many of the design criteria for high strength flexible connectors set forth therein was at least partially influenced by the desire to provide a capability for a contained inner fluid flow path. While the disclosed connector was primarily directed to an application or use as a marine riser, other applications and uses for that invention such as the present instance were specifically contemplated.

The search for hydrocarbon reservoirs under the ocean floor has now extended to areas beyond the capability of proven existing technology to locate and recover. Extreme wave and weather conditions coupled with even greater water depth has made both conventional fixed platform and subsea completions economically or technically unfeasible in certain instances. To overcome the limitations and disadvantages of conventional equipment, new concepts of a suitable work environment are continuously being developed to provide a suitable working platform to locate and produce the hydrocarbons.

One concept now receiving serious attention is the tension leg platform commonly referred to as a TLP. Rather than being fixed to and supported from the ocean floor as are conventional platforms, the tension leg platform is a floating assembly that is anchored to the ocean floor using an array of redundant anchor support legs that are maintained under tension to hold proper platform location. Unlike floating semi-submersible platforms which are either loosely anchored or dynamically positioned such that they move over a relatively large water surface area by the influence of wind and tide, the tensioned leg platforms are tightly secured by the tensioned legs to severely limit their movement range. With the floating platform construction, the tension legs can be released from their anchors and the platform towed from one operating site to another as desired. This multiple use capability greatly enhances the use economics and makes this type of platform particularly attractive for economically marginal hydrocarbon production situations.

The tensioned legs are anchored at one end to the ocean floor when the platform is operational. Normally, the securing anchors are permanently set on the ocean floor, but retrievable anchors may be used if desired. After a leg anchor is set on the ocean floor, the tension leg is extended from the platform to connect with the anchor using the mechanical connector of the present invention. Normally, redundant legs are extended in each anchoring direction from the floating platform. The connector mechanically attaches or secures each tension leg to an anchor, but may be released and the associated tension leg and connector retrieved for inspection as desired.

As the name so indicates, the platform legs are subjected to a large axial tension stress loading to maintain proper platform position. Because of this large tension loading, the legs are normally made relatively massive and heavy to provide a low stress level. Due to the resulting great weight of the legs, the mechanical connectors are set or actuated for securing by the weight of the tension leg being received or transferred to the anchor. In addition, weight set mechanical connectors are not normally acceptable unless the anchor engageable tension load bearing connector member is arranged to prevent damage to the permanently set anchor portion of the connector when connecting. During extreme sea or wind conditions, it is possible that a platform tension leg would be subjected to a short period of compression force loading. The possibility that such a compression loading condition may exist, even for a very brief period, excludes use of mechanical connectors that are released by a down and then up sequence of manipulation of the tubing leg.

Preferably, redundant remotely controlled release mechanisms are provided in each connector to insure separation when desired. It is also desirable that all of the operating or working parts of the mechanical connector be retrieved to the platform with the tension leg member for inspection and repair. Because of the undesirable features or shortcomings of the prior connector devices, their use in tension leg platform applications has been largely precluded.

To minimize bending and other undesired stress buildup in the tension legs, a flexible joint is preferably located in the tension legs adjacent the releasable mechanical connectors. If desired, a second flexible joint may also be disposed between the releasable connector and the anchor. The preferable flexible connectors utilized are similar to those disclosed in U.S. Pat. No. 4,360,226, identified above and which provide a central passageway through which an operating tool or controlled flow may pass.

SUMMARY OF THE INVENTION

The present invention relates to mechanically connecting at least two separable load carrying members or assemblies in a force carrying or transmitting relationship that may be released when desired. One of the connecting assemblies is designed to be secured at an anchoring or holding location such as the ocean floor. The other connector assembly, which carries all of the operating or moving parts for securing the two separable assemblies, is arranged to be retrievable with the connecting leg for inspection and maintenance purposes. One or more flex joints are operably associated with the retrievable connector assembly to prevent build-up of undesired stress.

The mechanical connector is set or connected by the weight of the connector member or assembly carrying the operating or moving parts which moves into weight transferring engagement with the anchored connector member or assembly. Once set, the connector is held from release until the release mechanism has been actuated in a specific controlled manner.

The primary connector release is effected by either controlled hydraulic pressure or mechanical actuation of a tool run through the tension leg to maintain the locking mechanism in the released position. The connector is also provided with a back-up release in the event the primary release operating mode is rendered inoperative.

BRIEF DESCRIPTION OF THE DRAWINGS

The FIGURE is a side view, partially in section, of a weight set mechanical connector of the present invention mounted for use in a leg of a tension leg floating platform and having an operably associated flexible joint leg of a tension leg floating platform.

DESCRIPTION OF THE PREFERRED EMBODIMENT

The mechanical connector of the present invention is illustrated in detail in the FIGURE where it is generally designated C. The connector C provides a structural component for securely joining first or second separate load carrying connector assemblies generally referenced as 10 and 12 in a force transfer relationship for carrying or transmitting a static load or force therebetween. Preferably, the connector C is employed to anchor a tension leg platform (not illustrated). The transmitted force or static load on a tensioned leg (not illustrated) is substantially pure axial tension for holding the floating platform in the desired operating position. It is to be understood, however, that the connector C is equally well suited for use in other applications. As will be explained in greater detail hereinafter, the illustrated connector C is a dual anchor assembly which can be selectively released by a plurality of separate methods or modes of operation when desired.

While the drawing does not illustrate a lower flex joint used with the connector C, such a lower flex joint may be utilized by connecting to the lower anchor template connector assembly 12 if desired. The outer anchor template or first connector assembly 12 is preferably arranged to be permanently installed at the inaccessible location for securing to which the desired connection is to be made. The tubular anchor connector assembly 12 is formed of a very simple design having a central connector receiving opening formed by an inner surface 12a having only a single machined latching recess or securing groove 12b for receiving therein the upper or second connector assembly 10. Inwardly tapered upwardly facing annular shoulder 12c helps guide the upper or retrievable assembly 10 into the proper connecting position. Retrieval of the entire upper connector assembly 10 following release of the connector C in a manner to be described provides the advantage of recovering all of the operating or working parts of the connector C to the platform or other convenient working location for inspection and any required maintenance. The upper connector assembly 10 preferably includes a universal flex joint, generally designated FJ, that is used to prevent the formation of bending stresses in the tension leg by enabling limited angular movement. The flex joint apparatus FJ is secured to the tubular tension leg using helical thread 13 in the usual manner. The flex joint apparatus FJ and its use and operation is described in greater detail in the Burton U.S. Pat. No. 4,360,226 identified above to which reference is hereby made for incorporation herein. Secured with the flex joint FJ as will be described in greater detail is a secondary tubular housing 14 of the upper connector assembly 10 which is secured in turn to the tubular primary connector housing of the upper connector assembly 10. The primary housing 16 is concentrically aligned with and extends downwardly from the secondary housing 14.

The primary connector housing 16 mounts the gapped primary locking ring or member 18 which is automatically radially expandable into a locking position in the mating single direction locking machined groove 12b formed within the anchor assembly 12 for mechanically connecting or operably securing the assemblies 10 and 12. During installation, the shoulder 12c and surface 12a constrict the ring 18 during the setting movement downwardly into the member 12. When the lock ring 18 aligns with locking groove 12b it automatically expands radially outwardly to fit or lock into the annular groove 12b in order that the load ring 18 will thereafter statically transmit the axial tensile force loading from the upper connector assembly 10 to the anchored connector assembly 12. Upward force on the lock ring 18 will result in securing in the groove 12b rather than collapsing the lock ring 18 to the released condition. This is achieved by controlling the taper of the lock ring 18 and the groove 12b. When downward movement of the primary connector housing 16 resumes or continues, the lock ring 18 will again be wedged by the groove 12b to radially contract to enable the continued downward movement of the connector housing 16 below locking groove 12b. Subsequent upward movement of the connector housing 16 will again align the lock ring 18 with the one groove 12b to enable the locking expansion of the ring 18 against upward movement. When the ring 18 is radially contracted out of the groove 12b into the released position by downward movement of the connector housing 16 and maintained in that condition, the upper assembly 10 is enabled to separate and be removed upwardly from the fixed anchor assembly 12.

The use of the radially movable gapped locking ring 18 provides the largest possible load bearing surface area for transmitting the axial tension static force or load at the lowest possible unit stress level in the materials or construction. The use of the locking ring 18 which provides substantially full 360° load bearing engagement prevents only a partial seating or engagement of the load ring 18 in the recess 12b during installation. The latter condition could result in premature failure of the connector C in the event of misalignment of the connector assemblies 10 and 12 during securing.

Disposed immediately above the load ring 18 and fixed to the primary housing 16 is a retainer or locking ring keeper 20 which captures an edge of the locking ring 18 for carrying or maintaining the locking ring 18 with the primary housing 16 when in the radially contracted released position during installation and retrieval of the upper connector assembly 10. The tapered surface 20a also guides longitudinal movement of the load ring 18 between radial operating positions.

The primary connector housing 16 is provided with a central opening or passageway 16a which provides both a flow path and a tool movement enabling passage for effecting selective release of the lock ring 18 when desired. A longitudinally shiftable retainer control sleeve 22 is operably disposed in the central opening 16a for controlled release operation by retention of the lock ring 18 in the released position. The retainer control sleeve 22 is provided with an outwardly facing annular groove 22a located between a pair of O-rings 24 and 26 that serve to seal the sleeve 22 to the primary housing 16 in a fluid pressure balanced manner. The sleeve 22 is longitudinally shiftable or movable from the position illustrated in the FIGURE and it should be understood that the sleeve 22 does not function to hold the locking ring 18 in the expanded locked position. As the assembly 10 housing 16 is lowered, the ring 18 is by design, free to compress or move radially inwardly as necessary during installation or weight set downward movement to align with the locking groove 12b. To effect release, the assembly 10 housing 16 is lowered, thereby automatically compressing the locking ring 18 below groove 12b. Thereafter, longitudinal shifting of sleeve 22 up or down, moves retainer rods 28 radially outward under the released locking ring 18 which has moved radially inwardly and upwardly adjacent and within the retainer 20. The outward movement of the retaining rods 28 secures or holds the ring 18 in the compressed, unlatched position, since the ring 18 must also move downwardly in order to move outwardly, due to the angle formed in the retainer 20. The assembly 10 is now free to be moved upward from assembly 12 for enabling separation of the connector assemblies 10 and 12.

Disposed adjacent the recess 22a and extending radially outwardly in a 90° spaced arrangement into operating engagement for holding or maintaining the lock ring 18 in the radially compressed or released position are a plurality of four movable lock or retainer rods 28. A spring 30 concentrically mounted about each of the retainer rods 28 continuously urges the retainer rod 28 into engagement with the annular recess 22a of the shiftable sleeve 22 sufficiently to displace the recess 22a for forcing the rods 28 outwardly under the recessed locking ring 18. To shift the sleeve 22 a sufficient longitudinal distance to effect the release operation, a selective tool movable through the passageway 16a engages with sleeve 22 which is then either hydraulically or mechanically shifted. The fixed retaining ring 31 serves to retain the latching sleeve 22 with the primary housing 16 to enable its retrieval to the platform P with the upper connector assembly 10 after release of the locking ring 18.

The primary housing 16 is mounted with and extends from the tubular secondary housing 14. Like the primary housing 16, the secondary housing 14 is provided with a central passageway 14a that is aligned with and placed in communication with the central passageway 16a of the primary housing 16 when the housings 14 and 16 are operably secured together. As will be explained in greater detail, the aligned central passageways 14a and 16a provide an operating fluid pressure conduit as well as a path for operating tools from the tension leg that may be used to actuate the release of the mechanical connector C when desired. A movable locking detent 32 is movably mounted with the secondary housing 14 for engaging a corresponding one direction locking recess 16e formed in the primary housing 16 for operably securing the two together. The recess 16e provides a locking receiver for coacting with the locking detent 32 for operably connecting the two in a releasable relationship. The locking detent 32 also provides maximum bearing area for transmitting the tension forces with the lowest possible unit stress in a manner similar to that of the locking ring 18. A detent retainer 34 having a tapered operating surface 34a is also provided on the secondary housing 14 for retaining the locking detent 32 in the event it is released to separate the secondary housing 14 from the primary housing 16.

To hold the locking detent 32 in the radially or constricted compressed unlocked position, a plurality of radially extending detent engaging members 36 are provided for maintaining the detent 32 elevated and contracted in the recess or locking receiver 16e in a manner similar to the retainers 28. A shiftable latch sleeve 38 is disposed adjacent the plurality of detent engaging members 36 for extending the plurality of radially disposed detent engaging members 36 into operating engagement with the radially compressible locking detent 32. The latch member or sleeve 38 is also selectively shiftable by a tool movable through the central passageway 14a for actuating the detent engaging members 36 to maintain the detent 32 in the released position. Through-the-bore movable well tools (not illustrated) that can select between the sleeve 38 or the sleeve 22 are well known to those skilled in the art and need not be be described in detail herein. By proper selection of a well tool movable through the passageways 14a and 16a the sleeves 38 and 22 may be selectively engaged and their shifting affected. Such shifting may be accomplished in a number of ways but the use of increased hydraulic pressure after seating in the appropriate shifting sleeve is preferred.

As mentioned previously, the flex joint FJ is formed as part of the first anchor assembly 10 and mounted above the secondary housing 14. A detent arrangement 42 secured by a releasable securing ring 44 is used to connect the flex joint housing 46 to the secondary housing 14. The flex joint housing 46 is connected with the upwardly facing tubular section 48 using the plurality of stacked roll plates 50 in the manner previously described in my Burton U.S. Pat. No. 4,360,226. A central tubular flow path 52 is provided for forming a central passageway 54 through the flex joint for communicating with the aligned passageways 14a and 16a to provide a passageway for the shifting tools (not illustrated). A biasing spring 56 is provided for holding the flow tube 52 in the proper position with the spherical head 52a received in the seat ring 58 secured to the upper flex joint member 48 which forms the threaded connection 13.

In the use and operation of the present invention, the lower connector assembly 12 is anchored at a suitable location for use. The upper or second connector assembly 10 is made up with the flex joint FJ and the secondary housing 14 and primary housing 16 operably connected in the manner illustrated. By use of the threads 13 a tension leg or other suitable member desired to be connected is attached to the connector assembly 10. As the connector assembly 10 moves into the anchor connector assembly 12 the locking ring 18 is free to radially contract enabling it to move downwardly within the tubular assembly 12 until the locking ring 18 is adjacent the recess 12b. At that point, the locking ring 18 is able to radially expand into the recess 12b and secure the members against separation by axial tension loading. In this condition, the connector C is securely engaged for transmitting the tension forces from the tension leg connected to the threads 13 to the connector assembly 12 and on to the anchor for holding a tension platform or other suitable device in the proper location. The angular relationship of the groove 12b and the latch ring 18 is chosen in order that latch ring 18 will be forced outwardly under design tensile loading to prevent inadvertent rolling of the locking ring 18 out of the groove 12b under normal operating conditions.

When it is desired to release the upper connector assembly 10 from the anchor connector assembly 12, it is preferred that the locking ring 18 be released in order that all operating parts of the connector assembly may be retrieved back to the tension leg platform where suitable inspection and maintenance inspection operations may be performed. To accomplish release of the locking ring 18 the connector housing 16 is lowered, thereby compressing lock ring 18 to the released position. Then the retainer control sleeve 22 is preferably engaged in a selected manner by a suitable tool and shifted downwardly or upwardly to actuate detent retainers or engaging members 28. Such release may be affected by either mechanical means engaging the shifting sleeve 22 or by hydraulic pressure after seating the well tool in the sleeve 22. The members 28 move out and under compressed locking ring 18, preventing it from moving down and out and thereby locking it in the compressed, unlatched position. Actual release and separation of the upper connector assembly 10 is then accomplished by lifting out of anchor connector assembly 12.

In the event the locking ring 18 will not release for any reasons, the secondary housing 14 can be released from the primary housing 16. This is accomplished by engaging the sleeve 38 selectively with the well tool movable through the bore 14a in the same manner. Upon lowering of the housing 14 into housing 16 and shifting of the sleeve 38, the plurality of detent engaging members 36 will lock the detent 32 in the radially compressed position in recess 60 located adjacent detent retainer 34 in the secondary housing 14 for enabling separation and retrieval of the secondary housing 14 and the flex joint FJ for inspection and maintenance operations. The secondary housing 14 can be reconnected with the primary housing 16 thereafter in a manner substantially similar to the installation of the primary locking ring 18 in recess 12b.

The foregoing disclosure and description of the invention are illustrative and explanatory thereof, and various changes in the size, shape and materials, as well as in the details of the illustrated construction may be made without departing from the spirit of the invention.

We claim:

1. A connector apparatus adapted for releasably securing two separable force transmitting assemblies in a force transfer relationship, including:
    a first connector assembly having a tubular member with an opening forming an inner surface, said inner surface having a recess formed therein for releasably receiving in securing engagement a second assembly;
    a second connector assembly having a primary housing and a secondary housing, said primary housing mounted to and extending from said secondary housing;
    a locking ring member movably mounted with said primary housing for movement to and from a radially contracted released position and a radially expanded locking position operably disposed within said recess of said tubular member for connecting said first connector assembly with said second connector assembly in force transmitting relationship;
    a keeper mounted with said primary housing for maintaining said locking member with said primary housing when said locking member is in the released position;
    means mounted with said primary housing for releasably holding said locking ring member in the radially contracted released position by a predetermined mode of actuation to enable said primary housing to separate from said tubular member of said first connector assembly said means for releasably holding said locking ring member actuated after said locking ring member is moved from said recess to the released position by relative movement of said connector assemblies; and
    means for releasably connecting said primary securing housing and said secondary securing housing for enabling separation and retrieval of said secondary housing should said locking member mounted with said primary securing housing fail to release from said recess of said first connector assembly.

2. The connector apparatus as set forth in claim 1, wherein said means for releasably connecting said primary housing and said secondary housing includes:
    a movable locking detent mounted with said secondary housing for operably connecting said primary housing with said secondary housing when in the locking position;
    said primary housing having a locking receiver for co-acting with said locking detent when in the locking position for operably connecting said primary housing with said secondary housing; and
    detent retainer means for maintaining said movable locking detent in the released position after movement of said locking detent from said locking receiver to enable separation of primary housing from said secondary housing when desired.

3. The connector apparatus as set forth in claim 2, wherein said detent retainer means further includes:
    a detent engaging member for maintaining said locking detent operably disposed in the released position; and
    a latch member movably mounted with said secondary housing and operably connected with said detent engaging member, said latch member movable by engagement with an operating tool for moving said detent engaging member to maintain said locking detent from movement to the locking position to enable separation of said primary housing from said secondary housing when desired.

4. The connector apparatus as set forth in claim 1, wherein:
    said primary housing and said secondary housing each having a passageway extending therethrough with said passageways disposed in operating communication when said primary housing is secured to said secondary housing; and
    said means for releasably holding said locking member in the radially contracted released position includes a plurality of retainers and a retainer control sleeve, said retainer control sleeve movably disposed in said passageway of said primary housing, said retainer sleeve movable to and from a holding position for holding said plurality of retainers in engagement with said locking member for maintaining said locking member in the released position for enabling separation of said second connector assembly from said first connector assembly.

5. The connector apparatus as set forth in claim 4, wherein:
    said retainer sleeve is selectively engageable by a tool movable in said passageway for moving said retainer sleeve from the holding position to the released position.

6. The connector apparatus as set forth in claim 4, wherein said means for releasably connecting said housing and said secondary housing includes:

- a movable locking detent mounted with said secondary housing for operably connecting said primary housing with said secondary housing when in the locking position;
- said primary housing having a locking receiver for co-acting with said locking detent for operably connecting said primary housing with said secondary housing; and
- detent retainer means for maintaining said movable locking detent in the released position after movement of said locking detent from said locking receiver to enable separation of said primary housing from said secondary housing when desired.

7. The connector apparatus as set forth in claim 6, wherein said detent retainer means further includes:

- a detent engaging member for maintaining said locking detent operably disposed in the released position; and
- a latch member movably mounted with said secondary housing and operably connected with said detent engaging member, said latch member movable by engagement with an operating tool for moving said detent engaging member to maintain said locking detent from movement to the locking position to enable separation of said primary housing from said secondary housing when desired.

8. The connector apparatus as set forth in claim 7, wherein:

- said retainer sleeve is selectively engageable by a tool movable in said passageway for moving said retainer sleeve from the holding position to the released position.

9. The connector apparatus as set forth in claim 8, wherein:

- said latch member is selectively engageable by a tool movable in said passageway for moving said latch member to release said detent wherein selection of the tool for movement through said passageways controls the release of the connector apparatus.

10. A connector assembly adapted for releasably securing with a second connector assembly with each assembly mounted with separable force transmitting members in a force transfer relationship, said connector assembly including:

- a primary securing housing and a secondary securing housing, said primary housing mounted to and extending from said secondary housing, each of said housings having a passageway extending therethrough with said passageways disposed in operating communication when said housings are operably secured together;
- a locking ring member movably mounted with said primary housing for movement to and from a radially contracted released position and a radially expanded locking position operably disposed within a recess of the second connector assembly for connecting therebetween in force transmitting relationship;
- a keeper mounted with said primary housing for maintaining said locking ring member with said primary securing housing when said locking member is in the released position;
- means mounted with said primary securing housing for releasably holding said locking ring member in the radially contracted released position by a predetermined mode of actuation to enable said primary housing to separate from the second connector assembly said means for releasably holding said locking ring member actuated after said locking ring member is moved from the recess of the second connector assembly to the released position by relative movement of said connector assembly and the second connector assembly; and
- means for releasably connecting said primary securing housing and said secondary securing housing for enabling separation and retrieval of said secondary securing housing should said locking ring member mounted with said primary securing housing fail to release from the recess of the second connector assembly.

* * * * *